United States Patent

Link

[15] 3,690,201
[45] Sept. 12, 1972

[54] ADJUSTING APPARATUS FOR INDEXIBLE TOOL TURRETS

[72] Inventor: Helmut Link, Esslingen/Neckar, Germany

[73] Assignee: Index-Werke KG, Hahn & Tessky, Esslingen/Neckar, Germany

[22] Filed: Sept. 17, 1970

[21] Appl. No.: 73,037

[30]       Foreign Application Priority Data

Oct. 2, 1969       Germany..........P 19 49 766.6

[52] U.S. Cl. .................... 82/24 R, 82/34 D, 82/24 A
[51] Int. Cl. ............................................ B23b 25/06
[58] Field of Search ................ 82/24, 24 A, 31, 34 D

[56]           References Cited

UNITED STATES PATENTS

| | | | |
|---|---|---|---|
| 2,563,918 | 8/1951 | Casella et al. ................. | 82/24 |
| 2,148,348 | 2/1939 | Groene et al. ............. | 82/24 X |
| 3,492,897 | 2/1970 | Cunningham et al. ...... | 82/24 X |
| 3,385,143 | 5/1968 | Walk ............................. | 82/24 |

FOREIGN PATENTS OR APPLICATIONS 147,876   3/1960   U.S.S.R. ..................... 82/24 A

*Primary Examiner*—Leonidas Vlachos
*Attorney*—Michael S. Striker

[57]                ABSTRACT

A machine tool wherein the frame supports a reciprocable carriage which in turn supports an indexible tool turret. The carriage is adjustable sideways with reference to the frame by means of two wedge-like shifting members which flank the ways for the carriage and normally share the movements of the carriage lengthwise of the ways. When the carriage is to be shifted sideways, the shifting members are caused to move relative to the carriage by means of a transmission which is mounted in the interior of the carriage and receives motion from an axially reciprocable sleeve which is movable into abutment with one of several axially adjustable bolts, one for each angular position of the turret.

11 Claims, 5 Drawing Figures

3,690,201

PATENTED SEP 12 1972

Inventor:
HELMUT LINK

ADJUSTING APPARATUS FOR INDEXIBLE TOOL TURRETS

BACKGROUND OF THE INVENTION

The present invention relates to adjusting apparatus for material removing tools in machine tools, and more particularly to improvements in apparatus for adjusting the positions of tools whose tool holders are mounted in an indexible tool turret. Still more particularly, the invention relates to improvements in machine tools of the type wherein the workpiece is rotated by a work spindle and the tools which are carried by the indexible tool turret are fed radially and/or axially of the revolving workpiece.

It is already known to change the position of an indexible tool turret with reference to the frame of the machine tool by means of the indexing pin. The indexing pin is parallel to the axis of the tool turret and is movable axially of the tool turret or vice versa to enter an indexing bore of the turret. When it assumes such inserted position, the indexing pin is adjustable sideways to thereby change the position of the turret and of the tools which are mounted in holders carried by the turret. The adjustment is effected individually for each working station while the respective tool engages the workpiece. The means for adjusting the indexing pin by moving it sideways comprises an elongated wedge-like shaft which carries the indexing pin and is mounted in the frame of the machine tool, an elongated wedge which engages the shaft and is movable lengthwise, and an oil-operated cylinder and piston unit which can move the wedge lengthwise. Such lengthwise movement of the wedge effects a sidewise movement of the shaft and of the indexing pin. The piston of the cylinder and piston unit is connected to the wedge and is movable in its cylinder to thereby adjust a selected tool holder by way of the turret, indexing pin, shaft of the indexing pin and the wedge.

The just described adjusting apparatus can be used with advantage in certain types of machine tools, namely, in machine tools wherein the indexing pin cooperates with a relatively large cross of the tool turret, e.g., with a four-armed cross. The indexing bores are provided in the outer ends of the arms of the cross. The accuracy of adjustment depends on the precision of finish and mounting of the aforedescribed parts because the indexing pin must act on relatively long arms of the cross so that the effort arm is a multiple of the effort arm of the corresponding tool holder. Moreover, the adjusting apparatus must be provided with a rather complicated device for effecting predetermined axial displacements of the piston.

SUMMARY OF THE INVENTION

An object of the invention is to provide an adjusting apparatus for the tool turret in a machine tool which can be installed in all or nearly all types of machine tools with indexible tool turrets.

Another object of the invention is to provide an adjusting apparatus which can change the position of the tool turret while a tool whose holder is mounted in the turret engages with or is disengaged from the workpiece.

A further object of the invention is to provide an adjusting apparatus which renders it possible to automatically adjust the turret in each of its indexed positions, either in accordance with a predetermined schedule or as a function of differences between the desired and actual dimensions of treated workpieces.

An additional object of the invention is to provide an adjusting apparatus which can be installed in existing machine tools with indexible tool turrets, which allows for a practically infinite number of adjustments in each angular position of the tool turret, and which can compensate for wear on the supports for the tool turret.

Still another object of the invention is to provide an adjusting apparatus for tool turrets which are mounted on a reciprocable carriage of a machine tool.

The invention is embodied in a machine tool which comprises a support, carriage means mounted for reciprocatory movement along the support, preferably along suitable ways provided on or secured to the support, a tool turret for several tool holders mounted on and indexible with reference to the carriage means between a plurality of angular positions, and novel adjusting means for effecting sidewise adjustments of the carriage means (and hence of the tool holder or holders carried by the tool turret). The adjusting apparatus comprises at least one elongated wedge-like shifting means having mutually inclined surfaces one of which engages the support and another of which engages the carriage means, and a device for moving the shifting means with reference to the carriage means or vice versa to thereby effect a sidewise adjustment of the tool turret and carriage means with reference to the support.

In accordance with a presently preferred embodiment of the invention, the adjusting apparatus comprises two discrete wedge-like shifting means which flank the ways for the carriage means and normally share the movements of the carriage means lengthwise of the ways. The two shifting means are preferably of identical size and shape and the aforementioned moving device of the adjusting apparatus is preferably designed to move the two shifting means in the same direction and through identical distances with reference to the carriage means.

The novel features which are considered as characteristic of the invention are set forth in particular in the appended claims. The improved adjusting apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
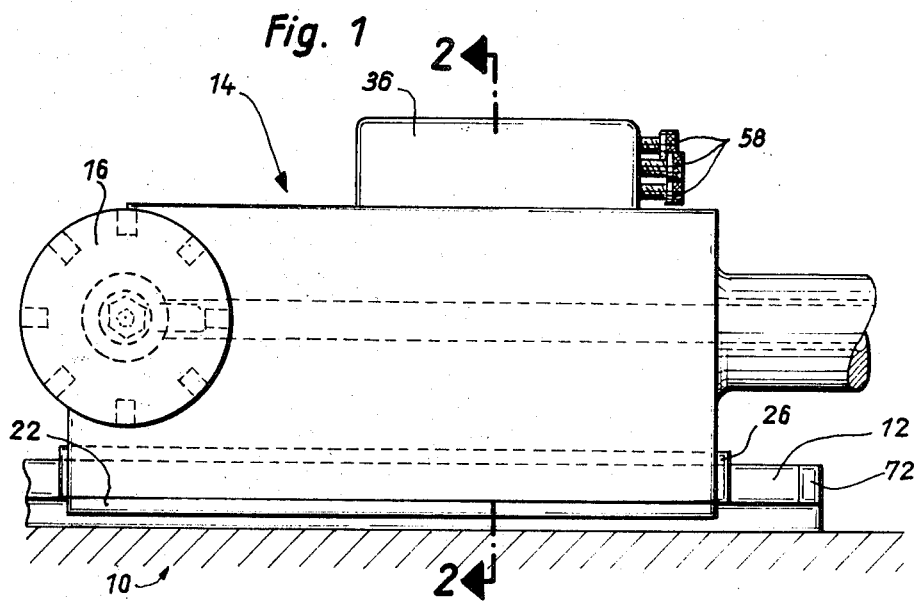
FIG. 1 is a fragmentary side elevational view of a machine tool wherein the carriage for the indexible tool turret is adjustable by the apparatus of the present invention.

Referring first to FIG. 1, there is shown a portion of a machine tool which comprises a support here shown as a frame 10 having elongated guide means or ways 12 for a reciprocable carriage 14. The means for reciprocating the carriage 14 forms no part of the present invention. This carriage supports an indexible tool turret 16 whose axis is horizontal and substantially normal to the longitudinal direction of the ways 12. The turret 16 can support six equidistant tool holders, not shown, and is indexible by an indexing means including an indexing shaft 59 which can rotate the turret stepwise, always through an angle of 60° or a multiple of 60°. The support 10 may also constitute a second carriage which is movable at right angles to the ways 12.

Figure 2:
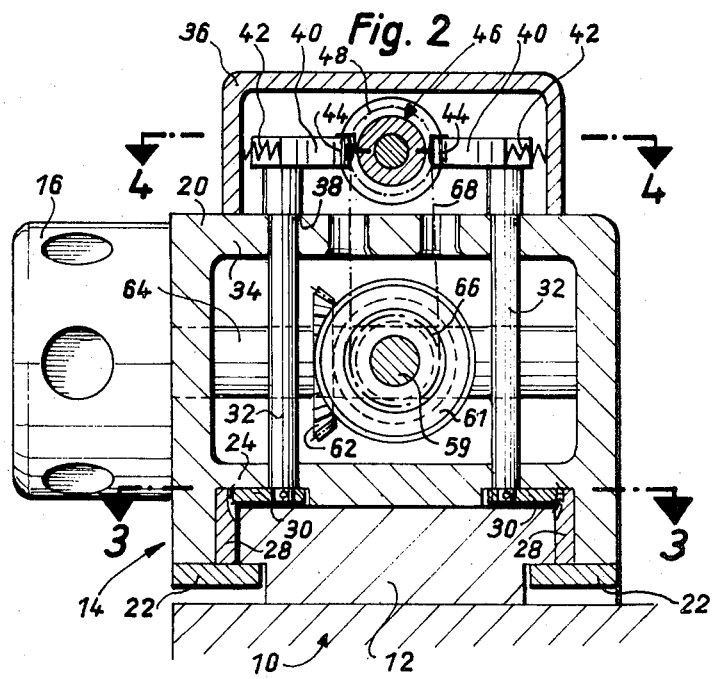
FIG. 2 is an enlarged transverse vertical sectional view as seen in the direction of arrows from the line 2—2 of FIG. 1.
Figure 3:
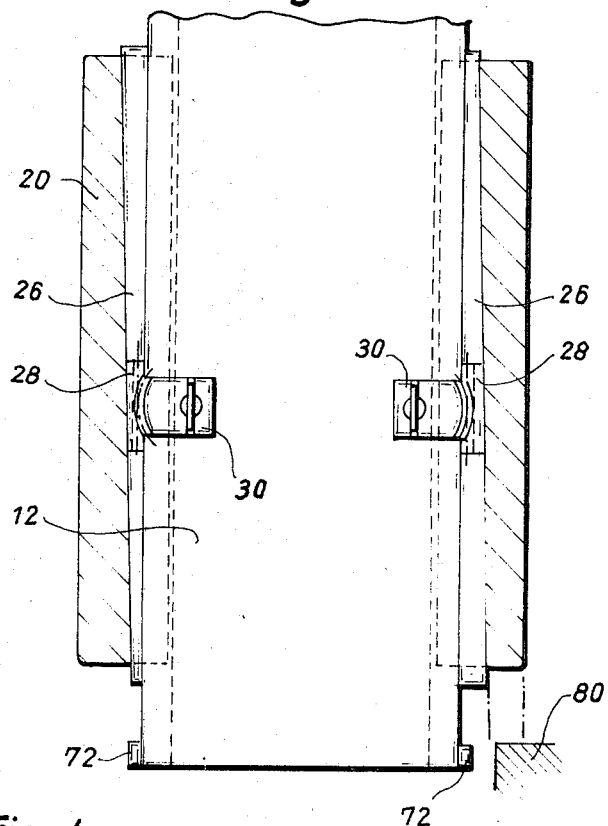
FIG. 3 is a horizontal sectional view as seen in the direction of arrows from the line 3—3 of FIG. 2.

The construction of the novel adjusting apparatus which serves to change the position of the tool turret 16 (and hence of the tool holders) with reference to the frame 10 is illustrated in FIGS. 2 to 5. The carriage 14 comprises a housing 20 whose downwardly extending side walls flank the ways 12 and carry guide plates 22 (see particularly FIG. 2) which engage adjacent horizontal shoulders of the ways to thereby hold the carriage 14 against movement upwardly and away from the base 10 but to permit movement of the carriage lengthwise of the ways 12. The housing 20 further comprises a transversely extending horizontal wall or bottom wall 24 which is located at a level above the guide plates 22 so as to provide room for two elongated wedge-like shifting members 26 (see FIGS. 1 and 3) each of which is adjacent to a vertical side surface of the ways 12 and is disposed between the underside of the wall 24 and the upper side of the respective guide plate 22. The shifting members 26 are movable with the carriage 14 lengthwise of the ways 12 whereby their tapering surfaces cause the carriage 14 (and the turret 16) to move sideways when the carriage moves with reference to the members 26 or vice versa. The configuration of the shifting members 26 is best shown in FIG. 3; it will be noted that one of these members tapers from one end toward the other end of the ways 12 and that the other shifting member tapers in the opposite direction. The arrangement is such that the two shifting members 26 preferably move as a unit to thereby effect a desired sidewise displacement of the carriage 12 and turret 16. Such sidewise displacement results in a desired adjustment of the position of tool holders in the turret 16 with reference to the frame 10 and hence with reference to the workpiece or workpieces (not shown) at the respective working stations. Each member 26 has two mutually inclined tapering surfaces one of which engages the carriage 14 and the other of which engages the ways 12.

Figure 4:
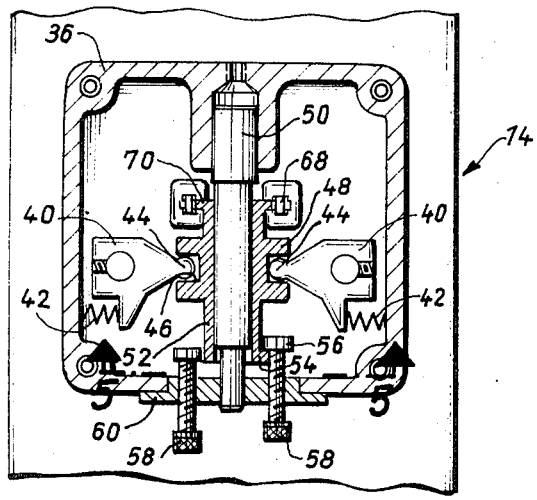
FIG. 4 is a horizontal sectional view as seen in the direction of arrows from the line 4—4 of FIG. 2.
Figure 5:
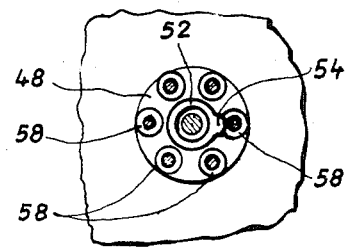
FIG. 5 is a fragmentary vertical sectional view as seen in the direction of arrows from the line 5—5 of FIG. 4.

The device for moving the shifting members 26 relative to the ways 12 is illustrated in FIGS. 2—4. As shown in FIGS. 2 and 3, the median portion of each shifting member 26 is formed with a toothed rack 28 which meshes with a gear 30 of a transmission. In the illustrated embodiment, the gears 30 are segments which are rotatable about vertical axes and are mounted at the lower ends of two rotary members here shown as parallel vertical rods 32 which are journalled in the housing 20 of the carriage 14. The rods 32 extend through the bottom wall 24 and upwardly through a transversely extending second or top wall 34 of the housing 20. Each rod 32 has a larger-diameter trunnion whose shoulder 38 rests on the upper side of the top wall 34 so that the rods 32 are positively held against axial movement in a downward direction. The trunnions of the rods 32 extend into a hollow attachment or casing 36 which is mounted on top of the housing 20. Each trunnion carries a follower 40 (see FIGS. 2 and 4) which is located in the interior of the casing 36 and has a rounded projection or tooth 44 received in an annular groove 46 provided on an axially movable motion transmitting sleeve 48. Each follower 40 is biased by a helical spring 42 which tends to pivot it in a direction to shift the sleeve 48 upwardly, as viewed in FIG. 4 (i.e., lengthwise of the ways 12). The sleeve 48 is reciprocable on a horizontal shaft 50 which is mounted in the casing 36.

FIG. 4 shows that the sleeve 48 is provided with a cylindrical extension 52 whose free end is formed with a radially extending projection 54 (see FIGS. 4 and 5) which can be engaged by the head 56 of one of six equidistant axially movable adjusting bolts 58. These bolts mesh with a disk-shaped insert 60 in the right-hand side wall of the casing 36, as viewed in FIG. 1. Each bolt 58 can be rotated to move axially and to thus change the position of its head 56.

FIGS. 2 and 4 illustrate certain parts of the indexing mechanism for the turret 16. Such mechanism comprises the indexing shaft 59 which is mounted in the housing 20 in the space between the walls 24, 34 and carries a bevel gear 61 meshing with a second bevel gear 62 which is mounted on the shaft 64 of the turret 16. The indexing mechanism further comprises a power train which can index the motion transmitting sleeve 48 in response to indexing of the turret 16. This power train includes a sprocket wheel 66 on the indexing shaft 59, a sprocket wheel 70 which is fixed to the sleeve 48, and an endless chain 68 which is trained over the sprocket wheels 66 and 70. The transmission ratio of the chain drive 66, 68, 70 is 1:1.

FIG. 3 shows that one end of the ways 12 carries two abutments 72 which extend into the path of movement of the shifting members 26 when such members move downwardly, as viewed in FIG. 3.

The operation:

When the tool turret 16 assumes a predetermined angular position, the projection 54 of the extension 52 on the sleeve 48 engages the head 56 of a particular one of the adjusting bolts 58. The position of the shifting members 26 can be changed by rotating the particular bolt 58 whereby the sleeve 48 moves axially of the shaft 50, either under the action of springs 42 which tend to move the sleeve 48 axially and away from the bolts 58 or under the action of the head 56 on the particular bolt 58 if such bolt is caused to move downwardly, as viewed in FIG. 4. As the sleeve 48 changes its axial position on the shaft 50, the followers 40 change the angular positions of the respective rods 32 (either under or against the action of the respective springs 42) whereby the segments 30 move the respective shifting members 26 lengthwise by way of the corresponding racks 28. It will be noted that the springs 42 permanently bias the followers 40 in such directions that the projection 54 of the extension 52 is caused to bear against the head 56 of the corresponding bolt 58. Since any axial movement of the sleeve 48 results in pivotal movement of the followers 40 in opposite directions, the gear segments 30 also rotate in opposite directions so that the shifting members 26 move in the same direction. This insures that any lengthwise displacement of the wedge-like shifting members results in a proportional sidewise movement of the carriage 14 and turret 16.

When the carriage 14 is caused to return to a starting or retracted position in which the tools in the tool holders installed in the turret 16 are retracted from the workpieces, the carriage travels in a direction to the right, as viewed in FIG. 1 (corresponding to a downward movement, as viewed in FIG. 3). The shifting members 26 strike against the respective abutments 72 on the ways 12 and, as the carriage 14 continues to move toward its retracted or starting position, it moves relative to the shifting members 26 which are held against further movement by the abutments 72. The racks 28 then pivot the gear segments 30 which in turn pivot the rods 32 and the followers 40 in directions to move the sleeve 48 downwardly, as viewed in FIG. 4, and to thus disengage the projection 54 of the extension 52 from the corresponding head 56. The carriage 14 is arrested in its retracted position (by a stop 80 shown in FIG. 3) when the projection 54 is disengaged from the adjacent head 56 so that the turret 16 can be readily indexed in response to rotation of the indexing shaft 59 through an angle which is necessary to rotate the turret through 60° or through a whole multiple of 60°. As the shaft 59 rotates, the chain drive 66, 68, 70 rotates the sleeve 48 through the same angle (for example, through 60°) whereby the projection 54 moves into registry with the head 56 of another adjusting bolt 58. It will be noted that the shifting members 26 automatically return to their foremost positions with reference to the carriage 14 when the latter is caused to move toward its starting or retracted position.

The carriage 14 is thereupon advanced to move at least one of the tools on the turret 16 into material-removing engagement with a workpiece. During the initial stage of such movement of the carriage 14 (upwardly, as viewed in FIG. 3), the springs 42 turn the followers 40 and the rods 32 to move the sleeve 48 upwardly, as viewed in FIG. 4, so that the projection 54 moves into engagement with the head 56 of the newly selected adjusting bolt 58. This results in an appropriate sidewise adjustment of the position of the carriage 14 and turret 16 with reference to the ways 12 and frame 10. Such adjustment can be determined in advance by placing the corresponding adjusting bolt 58 into a requisite axial position. Thus, the sidewise adjustment of the carriage 14 and turret 16 takes place automatically in response to indexing of the turret 16 and in response to subsequent movement of the carriage from its retracted or starting position in which the projection 54 is disengaged from all of the heads 56. The same procedure is repeated during each indexing of the turret 16.

The adjusting bolts 58 insure that the tool turret 16 automatically assumes a predetermined position with reference to the frame 10 in each of its angular positions with reference to the carriage 14. Thus, once the bolts 58 are properly adjusted, their axial positions can remain unchanged during treatment of an entire batch of workpieces. The bolts then insure that each tool is automatically held in a predetermined position while it moves into engagement with and during removal of material from a workpiece at the respective working station.

In accordance with a modification of the invention, the shaft 50 for the sleeve 48 can be replaced with a piston which is secured to the sleeve and is shiftable in a cylinder by a pressure medium. This renders it possible to remove the cutting edge of the tool from a workpiece prior to rapid movement of the carriage 14 to its retracted or starting position.

The improved adjusting apparatus can be used with particular advantage in large turret lathes but it is also useful in chucking machines. In a chucking machine, the tool turret must normally support several eccentrically mounted tools so that the position of the turret with reference to the frame requires adjustment in response to several or all indexing movements. Such eccentrically mounted tools may include coarse cutters, scoring tools, grooving tools and/or others.

It is further within the purview of the invention to provide the adjusting apparatus with automatic means which effects sidewise adjustments of the carriage 14 and turret 16 in accordance with a predetermined schedule or whenever an adjustment becomes necessary. For example, the machine tool can be equipped with one or more detectors which determine the deviation of actual or measured dimensions of treated workpieces from desired dimensions and send signals to an automatic programming unit which changes the axial positions of the respective adjusting bolts 58 as a function of the magnitude of measured differences. The detector or detectors can be operated periodically to make spot checks or continuously to effect practically uninterrupted adjustments of the bolts 58, whenever necessary. Also, the detectors may be associated with each tool holder or with one or more selected tool holders.

An important advantage of the improved adjusting apparatus is that it can shift the tool turret 16 and the carriage 14 transversely of the ways 12 prior, during or after engagement between a workpiece and a selected tool on the tool turret. This renders it possible, for example, to rapidly retract the carriage 14 to its starting position without leaving any scratch marks on the finished workpiece. Moreover, since the tools can be disengaged from the workpieces as soon as the removal of material is completed, the return movement of the carriage to its starting position can take place at a high speed to thereby reduce the length of intervals between successive operations with an attendant increase in the output of the machine tool. Also, the surface finish of workpieces which are treated in a machine tool embodying the improved adjusting apparatus is superior to the surface finish of workpieces which are treated in conventional machine tools with indexible tool turrets. Still further, the shifting members 26 can compensate for wear on the ways 12 and/or those portions of the carriage 14 which slide along the ways.

One of the shifting members 26 can be omitted without departing from the spirit of the invention. The single shifting member can be mounted in such a way that an adjustment takes place in response to movement of the carriage 14 with reference to the shifting member or in response to movement of the shifting member with reference to the ways 12 or another part of the frame 10. The carriage 14 can be urged against the single shifting member by means of suitable springs. However, the illustrated construction with two identically dimensioned and configurated shifting members is preferred at this time.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a machine tool, a combination comprising a support; carriage means mounted for reciprocating movement along said support; an indexible tool turret mounted on said carriage means; and an adjusting apparatus for effecting sidewise adjustment of said carriage means comprising at least one wedge-shaped shifting means having mutually inclined longitudinally extending surfaces one of which engages said support and another of which engages said carriage means, and a device for moving one of said means with reference to the other means and comprising at least one adjusting member mounted on said carriage means movable between a plurality of positions, a motion transmitting member mounted in said carriage means movable into engagement with said adjusting member in each position thereof, and transmission means provided in said carriage means for moving said shifting means lengthwise in response to movement of said motion transmitting member, said transmission means comprising a rotary member having a first portion operatively connected with said shifting means and a second portion constituting a follower in engagement with said motion transmitting member.

2. A combination as defined in claim 1, wherein said adjusting apparatus comprises two shifting means and said device comprises means for moving said two shifting means in the same direction and through identical distances with reference to said carriage means.

3. A combination as defined in claim 2, wherein said two shifting means are of identical size and shape.

4. A combination as defined in claim 1, wherein said first portion of said rotary member is a gear which meshes with a toothed rack provided on said shifting means.

5. A combination as defined in claim 1, wherein said device further comprises a shaft mounted in said carriage means and said motion transmitting member is a sleeve which is movable axially of said shaft.

6. A combination as defined in claim 5, wherein said sleeve comprises a projection which normally engages with said adjusting member.

7. A combination as defined in claim 6, wherein said sleeve is indexible with said turret and said device comprises a plurality of adjusting members, said projection being engageable by a different adjusting member in each indexed position of said sleeve.

8. A combination as defined in claim 6, wherein said carriage means is movable lengthwise to and from a starting position and said shifting means normally shares the lengthwise movements of but is movable with reference to said carriage means, said support having means for arresting said shifting means during movement of said carriage means toward said starting position whereby said transmission means disengages said projection from said adjusting member.

9. A combination as defined in claim 6, further comprising means for disengaging said projection from said adjusting member.

10. A combination as defined in claim 9, wherein said means for disengaging comprises a cylinder and a piston unit.

11. A combination as defined in claim 1, further comprising means for automatically moving said adjusting member to a different position in response to detection of discrepancies between the desired and actual dimensions of workpieces which are treated by the tools carried by said turret.

* * * * *